United States Patent [19]
Roberts

[11] Patent Number: 5,573,094
[45] Date of Patent: Nov. 12, 1996

[54] COMBINATION BEARING/FREEWHEEL CLUTCH

[75] Inventor: John E. Roberts, Los Altos, Calif.

[73] Assignee: GTE Government Systems Corporation, Del.

[21] Appl. No.: 399,861

[22] Filed: Mar. 7, 1995

[51] Int. Cl.$^6$ .................. F16D 41/061; F16D 41/069
[52] U.S. Cl. ..................... 192/45; 192/41 R; 192/46
[58] Field of Search ........................... 192/45, 41 R, 192/46, 45.1

[56] References Cited

U.S. PATENT DOCUMENTS

| | | | |
|---|---|---|---|
| 382,637 | 5/1888 | Curtis | 192/45 |
| 2,232,090 | 2/1941 | Anderson | 192/45 |
| 2,307,881 | 1/1943 | Dodge | 192/45.1 X |
| 3,006,447 | 10/1961 | Irwin | 192/45.1 |
| 5,449,057 | 9/1995 | Frank | 192/46 |

Primary Examiner—Rodney H. Bonck
Attorney, Agent, or Firm—J. Stephen Yeo; James J. Cannon, Jr.

[57] ABSTRACT

A ball bearing/freewheel clutch is provided with an inner race member defining an inner race surface; an outer race member defining an outer race surface concentric with said inner race member; and a raceway between said inner and outer races. The inner and outer race members each have a series of short radially oriented sawtooth inclines on their respective inner and outer race surfaces at right angles to said raceway. A plurality of modified ball bearings are disposed in said raceway between said inner and outer race members, such that said modified ball bearings serve to prevent relative rotation of said inner and outer race members in one direction, and to transmit a torque between said inner and outer races. In the preferred embodiment of the invention, said modified ball bearings have flattened poles which engage said sawtooth inclines in one direction of rotation.

1 Claim, 4 Drawing Sheets

FREEWHEEL

LOCKED

COMBINATION BEARING/FREEWHEEL CLUTCH

BACKGROUND OF THE INVENTION

1. Field of the Invention

The present invention pertains to the field of clutching mechanisms, and, in particular, to a combination ball bearing/freewheel clutch.

2. Description of the Prior Art

A freewheel clutch is a device that will drive a rotating load in one direction, but will allow it to freewheel or spin at any speed in the other direction. There is a need to make a more compact and rugged freewheel clutch. All current designs need separate devices to support the rotating load on the shaft and to have the shaft drive this load. Current techniques are called ratchet and pawl, wrap spring, sprag, roller clutch, ball clutch, tilting plate, and so forth. Each of these prior art devices needs the addition of some bearing device to support the driven load when it is in the freewheel mode.

Typical of the prior art is U.S. Pat. No. 4,635,771, which discloses a one-way clutch bearing having an outer race with an annular inner surface, an inner race with an annular outer surface corresponding to and concentric with the inner surface, and rolling members disposed in an annular space formed between the inner surface and the outer surface, whereby relative rotation of the inner and outer races in one direction is prevented by displacement of the rolling members in the space and a torque is transmitted. A holding means for holding the rolling members is provided at a displacement position whereat the rolling members transmit a predetermined transmission torque, and means is provided for decreasing a wedge angle at a position before the rolling members arrive at the displacement position.

SUMMARY OF THE INVENTION

In a first aspect of the invention, a bearing/freewheel clutch is provided with an inner race member defining an inner race surface; an outer race member defining an outer race surface concentric with said inner race member; and a raceway between said inner and outer races. The inner and outer race members each have a series of short radially oriented sawtooth inclines on their respective inner and outer race surfaces at right angles to said raceway. A plurality of modified ball bearings are disposed in said raceway between said inner and outer race members, such that said modified ball bearings serve to prevent relative rotation of said inner and outer race members in one direction, and to transmit a torque between said inner and outer races.

In a second aspect of the invention, said modified ball bearings have flattened poles which engage said sawtooth inclines.

DESCRIPTION OF THE PREFERRED EMBODIMENT

A freewheel clutch is a device that will drive a rotating load in one direction, but will allow it to freewheel or spin at any speed in the other direction. This invention involves the use of modified balls and special inner and outer races to achieve both a rotational support and a one way clutch.

Figure 4A:
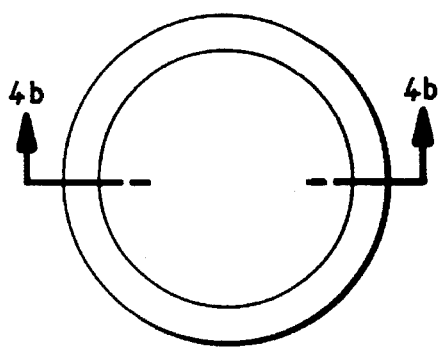
FIG. 4a is a top view of the ball bearing used in the preferred embodiment of the present invention.
Figure 4B:
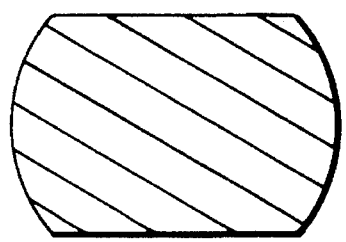
FIG. 4b is a side cross-sectional view of the ball bearing, taken along the line 4b—4b of FIG. 4a, used in the preferred embodiment of the present invention.

FIG. 4a is a top view of the ball bearing 10 used in the preferred embodiment of the present invention. FIG. 4b is a side cross-sectional view of the ball bearing of FIG. 4b, taken along the line 4b—4b. As shown in the Figures, each ball 10 is modified by grinding its poles 12 flat. Both Figures show the relative dimensions of a flattened ball of the present invention.

Figure 1:
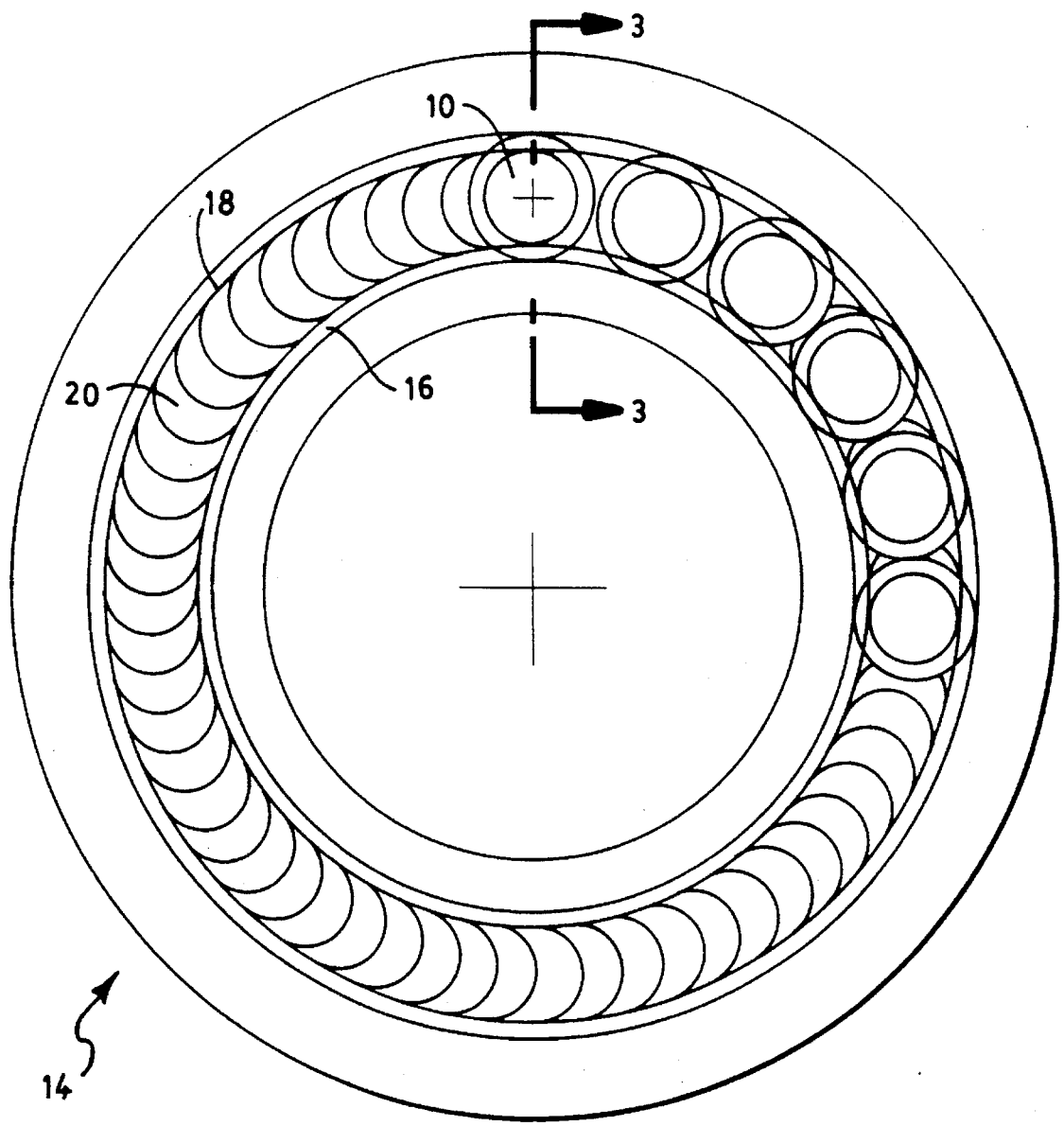
FIG. 1 is a horizontal cross-sectional view of the preferred embodiment of the combination bearing/freewheel clutch of the present invention.

FIG. 1 is a horizontal cross-sectional view of the preferred embodiment of the combination bearing/freewheel clutch 14 of the present invention. Clutch 14 has an inner race member 16 defining an inner race surface, an outer race member 18 defining an outer race surface, and a plurality of modified ball bearings 10 in a raceway 20 therebetween. The ball bearings are modified by having their poles flattened, as mentioned with reference to FIGS. 4a, 4b. The inner race member 16 and the outer race member 18 each have a series of short sawtooth inclines 22 on said inner and outer race members 16, 18 at right angles to said raceway 20. These short sawtooth inclines 22 act as ratchets.

Figures 2A, 2B:
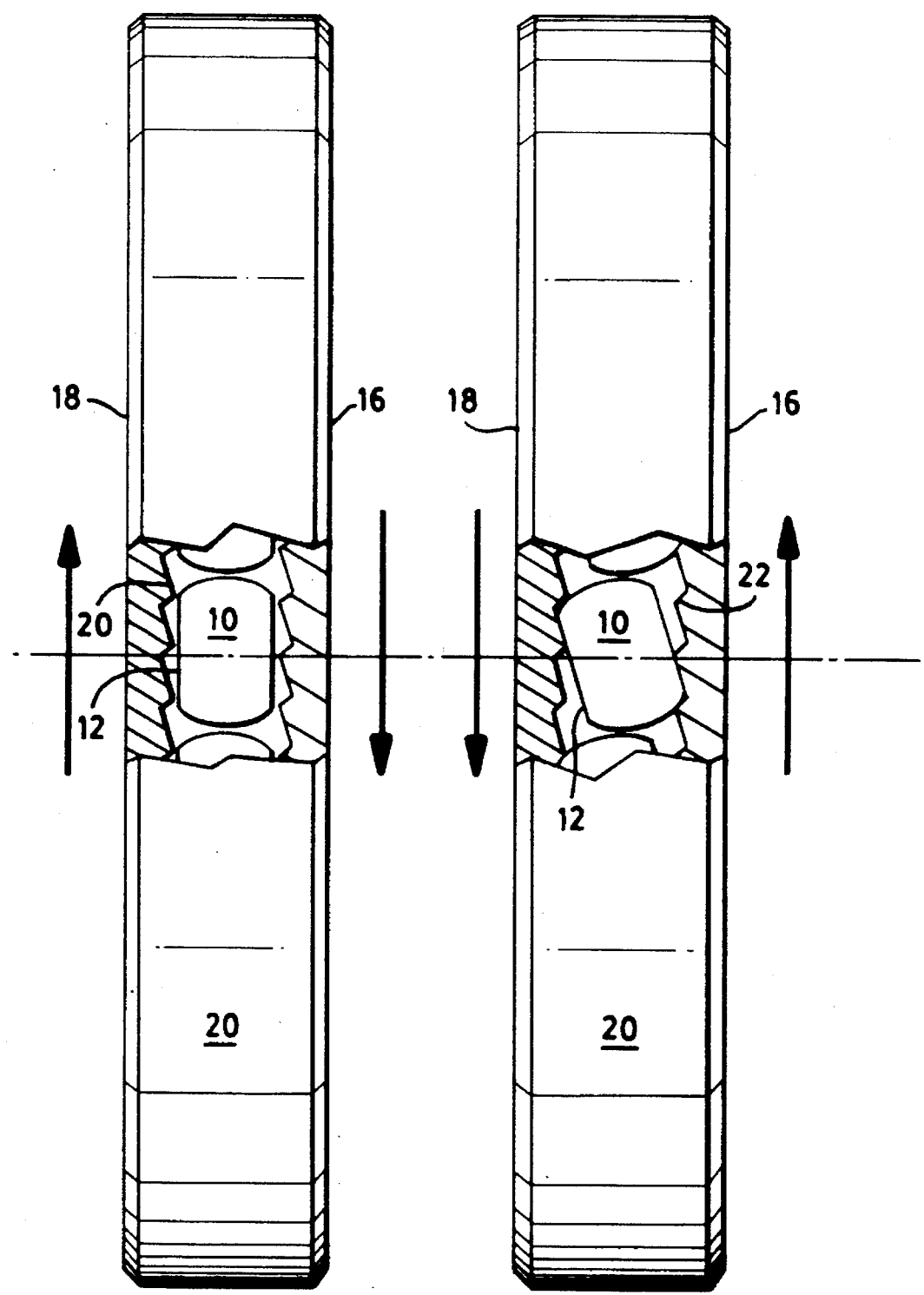
FIGS. 2a, 2b are horizontal views of the combination bearing/freewheel clutch of FIG. 1, showing in a break away a single ball bearing in the free wheel and locked positions respectively, according to the preferred embodiment of the present invention.
Figure 3A:
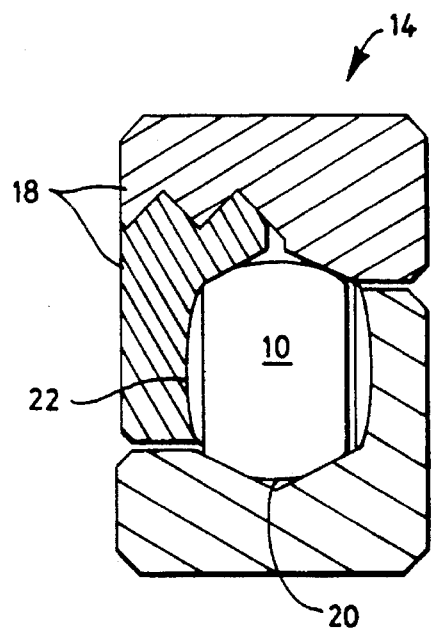
FIGS. 3a, 3b are vertical cross-sectional views of the ball bearings of FIGS. 2a, 2b respectively, taken along the line 3—3 of FIG. 1, according to the preferred embodiment of the present invention.
Figure 3B:
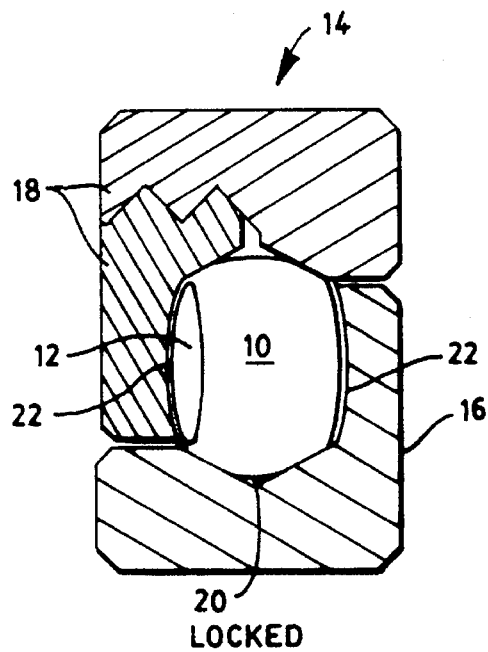

The flatten poles 12 of the balls 10 act as pawls. When the inner and outer race 16, 18 rotate in the freewheel mode (FIGS. 2a and 3a), the balls 10 are forced to roll past the inclines 22. When the races 16, 18 rotate in the clutch engaged or counter rotation mode (FIGS. 2b and 3b), the balls 10 which will naturally wobble slightly, will twist just enough to engage the inclines 22 of both races 16, 18 and therefore the races will lock together. Torque is transmitted by the radially oriented sawtooth inclines 22 integral to the inner race 16 and the outer race 18, which act to wedge the modified balls 10 between these radially oriented inclines.

Each of the modified ball bearings 10 makes an X contact with the inner race surface 16 and the outer race surface 18. This prevents the races 16, 18 from separating when the devices locks up and the balls 10 try to wedge the races apart. The races could also be radial or duplex angular contact types.

The inner race member 16 is connected to a driven member (not shown) and the outer race member 18 is connected to a driving member (not shown). The clutch 14 transmits torque in only one direction of rotation, as shown by the direction of the arrows in FIGS. 2b and freewheels in the other direction, as shown by the direction of the arrows in FIGS. 2a. The modified ball bearings 10 move out of or into engagement with the sawtooth inclines 22 into a disengaged or engaged position, as shown in FIGS. 2a, 3a and 2b, 3b, respectively. This ensures a short response travel and with if a rapid switch over from the one driving direction into the other free wheel direction. The movement between a locked position wherein the clutch is connected therewith, and a free position where in the clutch is disengaged and disconnected from the inner and outer races 16, 18 for free rotation with respect thereto is rapid and noiseless.

An irreversible freewheeling clutch arrangement having a hollow housing member for rotatably supporting an input drive shaft and an output driven shaft. A one-way transmission mechanism is provided including a plurality of roller bearings caged between a plurality of arcuate segments formed on the input shaft and cooperatively associated with a multi-faced contact member carried by the output shaft so that rotary movement of the input shaft is transferred to the output shaft but attempted movement of the output shaft is not transmitted to the input shaft.

The features of this design for a combination ball bearing/ freewheel clutch that are believed to be new are that it is stronger, lighter, easier to manufacture, and smaller than prior art designs, and that it is scalable to any size.

Figure 5:
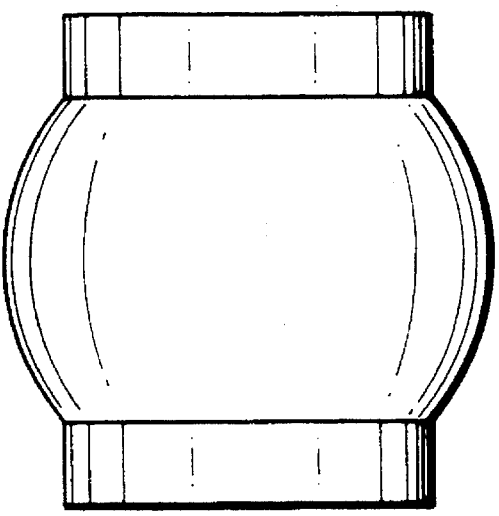
FIGS. 5 and 6 are vertical cross-sectional views of alternate embodiments of the ball bearing which may be used in the preferred embodiment of the present invention.

Several alternate forms of the preferred embodiment of the invention are possible. The clutching action is extremely swift, sure and repeatable within a tolerance range in the device described above. This tolerance range can be made smaller by replacing the pole flats 12 with cylinders 13, as shown in FIG. 5. These cylinders will engage the ratchet faces of the races more quickly and allow even higher torque to be transmitted.

Figure 6:
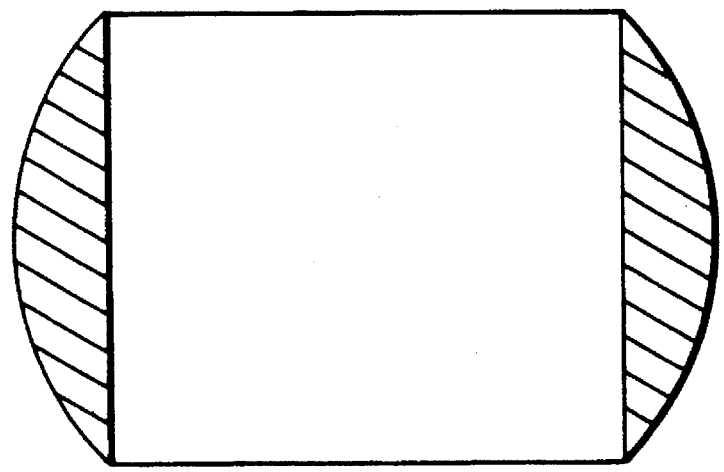

The balls 10 could be pierced with a sufficiently large cylindrical hole, as shown in FIG. 6. The balls could be half their solid weight. This would make them even faster in response and would have the serendipitous effect of allowing generous tolerances between the inner and outer races and or allowing a significantly higher preload to increase bearing stiffness and load carrying ability.

The balls could be replaced with rollers of almost any aspect ration. The inner and outer races would be configured to suit.

The sawtooth inclines 22 do not have to be at right angles.

The driving member could be either race.

The ball bearing/freewheel clutch can be machined into the mechanism that uses its functions, making an even more compact assembly. For example, the inner race may be part of a shaft and the outer race may be machined into a housing.

This invention works for radial, thrust, angular contact, crossed roller, "X" contact ball, needle, tapered roller, double cone, slim race, caged, full compliment, linear and other anti-friction style bearings.

The number of balls 10 and the number of ratchets 22 on each race 16, 18 can all be varied to increase the number of possible engagements. This would decrease the minimum backlash angle.

The number of balls 10 and ratchets 22 could conversely be optimized to increase the number of simultaneous engagements. This would maximize the torque carrying ability.

I claim:

1. A bearing/freewheel clutch comprising:

an inner race member defining an inner race surface;

an outer race member defining an outer race surface concentric with said inner race surface;

a raceway between said inner and outer races;

said inner race member and the outer race member each having a series of substantially radially oriented sawtooth inclines, said sawtooth inclines being at substantially right angles to said raceway surfaces; and a plurality of bearings disposed in said raceway between said inner and outer race members, said bearings providing rotational support between said outer race surface and said inner race surface;

said bearings having substantially flat poles for engaging said sawtooth inclines to prevent relative rotation of said inner and outer race members in one direction of rotation for transmitting a torque between said inner and outer races, and to allow said race members to freewheel in the other direction of rotation, functioning as a one way clutch.

* * * * *